(12) United States Patent
Jiang et al.

(10) Patent No.: US 10,095,903 B2
(45) Date of Patent: Oct. 9, 2018

(54) BLOCK DECODING METHOD AND SYSTEM FOR TWO-DIMENSIONAL CODE

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 0 days.

(21) Appl. No.: 15/871,188

(22) Filed: Jan. 15, 2018

(65) Prior Publication Data

US 2018/0137322 A1  May 17, 2018

Related U.S. Application Data

(63) Continuation of application No. PCT/CN2016/090993, filed on Jul. 22, 2016.

(30) Foreign Application Priority Data

Jul. 27, 2015 (CN) .......................... 2015 1 0446105

(51) Int. Cl.
*G06K 7/14* (2006.01)
*G06K 19/06* (2006.01)
*G06K 7/10* (2006.01)

(52) U.S. Cl.
CPC ....... *G06K 7/1417* (2013.01); *G06K 7/10722* (2013.01); *G06K 7/1478* (2013.01); *G06K 19/06037* (2013.01)

(58) Field of Classification Search
CPC ............. G06K 7/1417; G06K 7/10722; G06K 7/1478; G06K 19/06037
See application file for complete search history.

(56) References Cited

U.S. PATENT DOCUMENTS

2015/0090791 A1\* 4/2015 Zhang .................. G06K 7/1417
235/462.04
2017/0161750 A1\* 6/2017 Yao ........................ G06Q 20/40

FOREIGN PATENT DOCUMENTS

CN 104517089 A 4/2015

\* cited by examiner

*Primary Examiner* — Sonji N Johnson (57) ABSTRACT

A block decoding method includes: storing a received two-dimensional code image in an image data backup register; binarizing the received two-dimensional code image; searching for a boundary line of the two-dimensional code image; segmenting each of the regions into bit regions each of which corresponds to one bit data; re-acquiring the received two-dimensional code image stored in the image data backup register; calculating an average gray-scale value of all the pixels in the bit region as a gray-scale value of the bit region; calculating a gray-scale threshold of each of the bit regions n using the Otsu method; binarizing the bit region so as to obtain a binarized two-dimensional code image; and decoding the binarized two-dimensional code image. A system for a two-dimensional code is also disclosed.

13 Claims, 5 Drawing Sheets

BLOCK DECODING METHOD AND SYSTEM FOR TWO-DIMENSIONAL CODE

CROSS REFERENCE TO RELATED APPLICATIONS

The present application is a Continuation Application of PCT Application No. PCT/CN2016/090993 filed on Jul. 22, 2016, which claims the benefit of Chinese Patent Application No. 201510446105.4 filed on Jul. 27, 2015. All the above are hereby incorporated by reference.

FIELD OF THE INVENTION

The invention relates to the technical field of a two-dimensional code, and in particular to a block decoding method and system for a two-dimensional code.

BACKGROUND OF THE INVENTION

The two-dimensional code decoding algorithm based on image processing can be generally divided into six steps: acquiring an image, preprocessing image, positioning and correcting, reading data, error correcting and decoding. The basic step of image preprocessing includes gray-scale transformation, image filtration, threshold segmentation and edge detection, and binarization is included in the threshold segmentation. After enhancement algorithms such as contrast adaption and brightness adjustment are applied to the obtained gray-scale image, the background and the target in the image are segmented using the binarized image algorithm, and the image is converted into an image with only two colors of black and white for subsequent use in decoding.

However, due to factors such as different media on which the two-dimensional code is attached, different lighting environments and different imaging systems, the two-dimensional code images captured by the two-dimensional code reading devices may differ greatly, and the influence of noise, image lighting unevenness and a contrast that is too large or too small will all make the conversion of the two-dimensional code image into a binarized image be very complicated. However, the effect of image binarization process has a direct influence on the two-dimensional code reading effect. The binarization methods in the prior art have some deficiencies in dealing with a complicated background, and cannot well handle problems such as darkness, uneven lighting, too large contrast, or too small contrast, thus failing to obtain a good binarization effect. A poor binarization effect of the image increases the difficulty in subsequent decoding, or increases amount of operation, or reduces accuracy of decoding, and may even results in that the decoding step cannot be performed successfully.

Chinese invention patent publication No. CN104517089A discloses a two-dimensional code decoding system and method. The decoding method includes: binarizing a two-dimensional code image to obtain a binarized image, and the binarization processing includes: segmenting the two-dimensional code image to obtain several block regions; acquiring gray-scale values of all the pixels in each of the block regions, and obtaining a gray-scale value of each of the block regions according to the gray-scale values of all the pixels; calculating a gray-scale threshold of each of the block regions according to an average gray-scale value of the predetermined range in which the block region is located; binarizing pixels in the block region to obtain a binarized image, according to the gray-scale threshold corresponding to each of the block regions; and decoding the binarized image to obtain information content contained in the two-dimensional code. In binarizing the code image, by segmenting the code image into blocks, the average gray-scale value of a predetermined range of the block region in which the pixel is located is considered when determining whether the pixel in each block region is black or white during the process of restoring the code image. In this way, interference from the external environment is avoided. The two-dimensional code image is segmented into n*n block regions, where n>1. The two-dimensional code image is not segmented based on the functional modules of the two-dimensional code, and therefore information in the functional modules of the two-dimensional code cannot be positioned and decoded quickly and accurately. Moreover, the two-dimensional code image is decoded by binarizing the pixels in the block regions after the gray-scale threshold of each block region is calculated, and one pixel does not indicate one data bit of the two-dimensional code image. Therefore, a process of decoding the two-dimensional code by binarizing the pixels is complicated.

SUMMARY OF THE INVENTION

The technical problem to be addressed by the invention is to provide a block decoding method and system for a two-dimensional code, which have precise segmentation and accurate decoding.

In order to address the technical problem, the invention provides the following technical solutions.

A block decoding method for a two-dimensional code includes:

storing a received two-dimensional code image in an image data backup register;

binarizing the received two-dimensional code image based on a gray-scale value of a pixel;

searching for a boundary line of the two-dimensional code image based on a position detection pattern;

searching for a version number and a correction pattern of the two-dimensional code image;

segmenting the two-dimensional code image into regions based on the boundary line of the two-dimensional code image, a straight line where a boundary line of the position detection pattern is located and a straight line where a boundary line of the correction pattern is located;

calculating the number of bits in each of the regions based on the position detection pattern, the correction pattern and the version number;

segmenting each of the regions into bit regions each of which corresponds to one bit data, based on deformation amount of the position detection pattern and deformation amount of the correction pattern;

re-acquiring the received two-dimensional code image stored in the image data backup register;

calculating an average gray-scale value of all the pixels in the bit region as a gray-scale value of the bit region;

calculating a gray-scale threshold of each of the bit regions based on the gray-scale value of the bit region using the Otsu method;

binarizing the bit region based on the gray-scale threshold so as to obtain a binarized two-dimensional code image; and decoding the binarized two-dimensional code image.

The invention has the following advantageous effects. Since the sizes, shapes and positions of the position detection pattern and the correction image corresponding to the version number of the two-dimensional code are fixed, it is a reasonable to segment the two-dimensional code image into regions based on the position detection pattern and the correction pattern, and segment the region into bit regions corresponding to bit data based on the deformation amount of the position detection pattern and the deformation amount of the correction pattern, thereby eliminating the influence of the deformation amount of the two-dimensional code image on the segmentation precision of the two-dimensional code image, improving the segmentation precision and increasing the segmentation speed. The received two-dimensional code image stored in the image data backup register is re-acquired after segmenting the two-dimensional code image into regions, and this is equivalent to re-acquiring the coordinates and gray-scale values of the pixels in the received two-dimensional code image, thereby preventing decoding precision of the two-dimensional code image from being affected by the previous binarized data, and improving decoding precision of the two-dimensional code. The received two-dimensional code image is segmented into bit regions, and a gray-scale value of the bit region is calculated based on an average gray-scale value of pixels in the bit region, thereby effecting quick decoding. The two-dimensional code image is segmented into at least one region, and a gray-scale threshold of each region is calculated using the Otsu method, thereby reducing the influence of environmental factors such as lights on the gray-scale value of each region, and reducing a possibility of misclassifying a foreground color from a background color in each region.

A block decoding method for a two-dimensional code includes:

storing a received two-dimensional code image in an image data backup register;

binarizing the received two-dimensional code image based on a gray-scale value of a pixel;

searching for a boundary line of the two-dimensional code image based on a position detection pattern;

searching for a version number of the two-dimensional code image;

segmenting the two-dimensional code image into regions based on the boundary line of the two-dimensional code image and a straight line where a boundary line of the position detection pattern is located;

calculating the number of bits in each of the regions based on the position detection pattern and the version number;

segmenting each of the regions into bit regions each of which corresponds to one bit data, based on deformation amount of the position detection pattern;

re-acquiring the received two-dimensional code image stored in the image data backup register;

calculating an average gray-scale value of all the pixels in the bit region as a gray-scale value of the bit region;

calculating a gray-scale threshold of each of the bit regions based on the gray-scale value of the bit region using the Otsu method;

binarizing the bit region based on the gray-scale threshold so as to obtain a binarized two-dimensional code image; and decoding the binarized two-dimensional code image.

The invention has the following advantageous effects. In case that some two-dimensional codes do not include a correction pattern, since the size, shape and position of the position detection pattern corresponding to the version number of the two-dimensional code are fixed, it is a reasonable to segment the two-dimensional code image into regions based on the position detection pattern, and segment the region into bit regions corresponding to bit data based on the deformation amount of the position detection pattern, thereby eliminating the influence of the deformation amount of the two-dimensional code image on the segmentation precision of the two-dimensional code image, improving the segmentation precision and increasing the segmentation speed. The received two-dimensional code image stored in the image data backup register is re-acquired after segmenting the two-dimensional code image into regions, and this is equivalent to re-acquiring the coordinates and gray-scale values of the pixels in the received two-dimensional code image, thereby preventing decoding precision of the two-dimensional code image from being affected by the previous binarized data, and improving decoding precision of the two-dimensional code. The received two-dimensional code image is segmented into bit regions, and a gray-scale value of the bit region is calculated based on an average gray-scale value of pixels in the bit region, thereby effecting quick decoding. The two-dimensional code image is segmented into at least one region, and a gray-scale threshold of each region is calculated using the Otsu method, thereby reducing the influence of environmental factors such as lights on the gray-scale value of each region, and reducing a possibility of misclassifying a foreground color and a background color in each region.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number and a correction pattern of the two-dimensional code image;

a first segmenting module which is configured for segmenting the two-dimensional code image into regions based on the boundary line of the two-dimensional code image, a straight line where a boundary line of the position detection pattern is located and a straight line where a boundary line of the correction pattern is located;

a first calculating module which is configured for calculating the number of bits in each of the regions based on the position detection pattern, the correction pattern and the version number;

a second segmenting module which is configured for segmenting each of the regions into bit regions each of which corresponds to one bit data, based on deformation amount of the position detection pattern and deformation amount of the correction pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

The invention has the following advantageous effects. The received two-dimensional code image is stored in the image data backup register, thus facilitating re-acquiring the received two-dimensional code image after segmenting into bit regions, avoiding the influence of binarization of the received two-dimensional code image on the decoding precision before segmenting into the bit regions, and improving the decoding precision. The boundary line and the version number of the two-dimensional code image and the correction pattern are searched for based on the position detection pattern, and the two-dimensional code image is segmented into regions based on the boundary line of the position detection pattern and the boundary line of the correction pattern, thereby reducing the influence of environmental factors such as lights and scanning angle on the two-dimensional code image. The region is segmented into bit regions corresponding to bit data based on the deformation amount of the position detection pattern and the deformation amount of the correction pattern, thereby preventing the accuracy of segmenting into the bit regions from being affected by the deformation amount of the received two-dimensional code image, and meanwhile effecting quick decoding of the two-dimensional code image by segmenting into the bit regions.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number of the two-dimensional code image;

a first segmenting module which is configured for segmenting the two-dimensional code image into regions based on the boundary line of the two-dimensional code image and a straight line where a boundary line of the position detection pattern is located;

a first calculating module which is configured for calculating the number of bits in each of the regions based on the position detection pattern and the version number;

a second segmenting module which is configured for segmenting each of the regions into bit regions each of which corresponds to one bit data, based on deformation amount of the position detection pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

The invention has the following advantageous effects. In case that some two-dimensional codes do not include a correction pattern, the received two-dimensional code image is stored in the image data backup register, thus facilitating re-acquiring the received two-dimensional code image after segmenting into bit regions, avoiding the influence of binarization of the received two-dimensional code image on the decoding precision before segmenting into the bit regions, and improving the decoding precision. The boundary line and the version number of the two-dimensional code image are searched for based on the position detection pattern, and the two-dimensional code image is segmented into regions based on the boundary line of the position detection pattern, thereby reducing the influence of environmental factors such as lights and scanning angle on the two-dimensional code image. The region is segmented into bit regions corresponding to bit data based on the deformation amount of the position detection pattern, thereby preventing the accuracy of segmenting into the bit regions from being affected by the deformation amount of the received two-dimensional code image, and meanwhile effecting quick decoding of the two-dimensional code image by segmenting into the bit regions.

| Reference numbers | |
|---|---|
| 1. first region; | 2. second region; |
| 3. third region; | 4. fourth region; |
| 5. fifth region; | 6. sixth region; |
| 7. seventh region; | 8. eighth region; |
| 9. ninth region; | 10. position detection pattern; |
| 11. correction pattern; | 12. position detection pattern. |

DETAILED DESCRIPTION OF THE PREFERRED EMBODIMENTS

In order to illustrate the technical solutions, the objects and effects of the invention in detail, embodiments are described below in conjunction with the accompanying drawings.

A critical concept of the invention is to segment a two-dimensional code image into regions in consideration of deformation amount of a position detection pattern and deformation amount of a correction pattern of the two-dimensional code image, and to divide the segmented region into bit regions corresponding to bit data, thereby improving segmenting precision; and to re-read the two-dimensional code image after the two-dimensional code image is segmented into bit regions, thereby realizing quick and accurate decoding.

A specific embodiment of the invention is described as follows.

Figure 1:
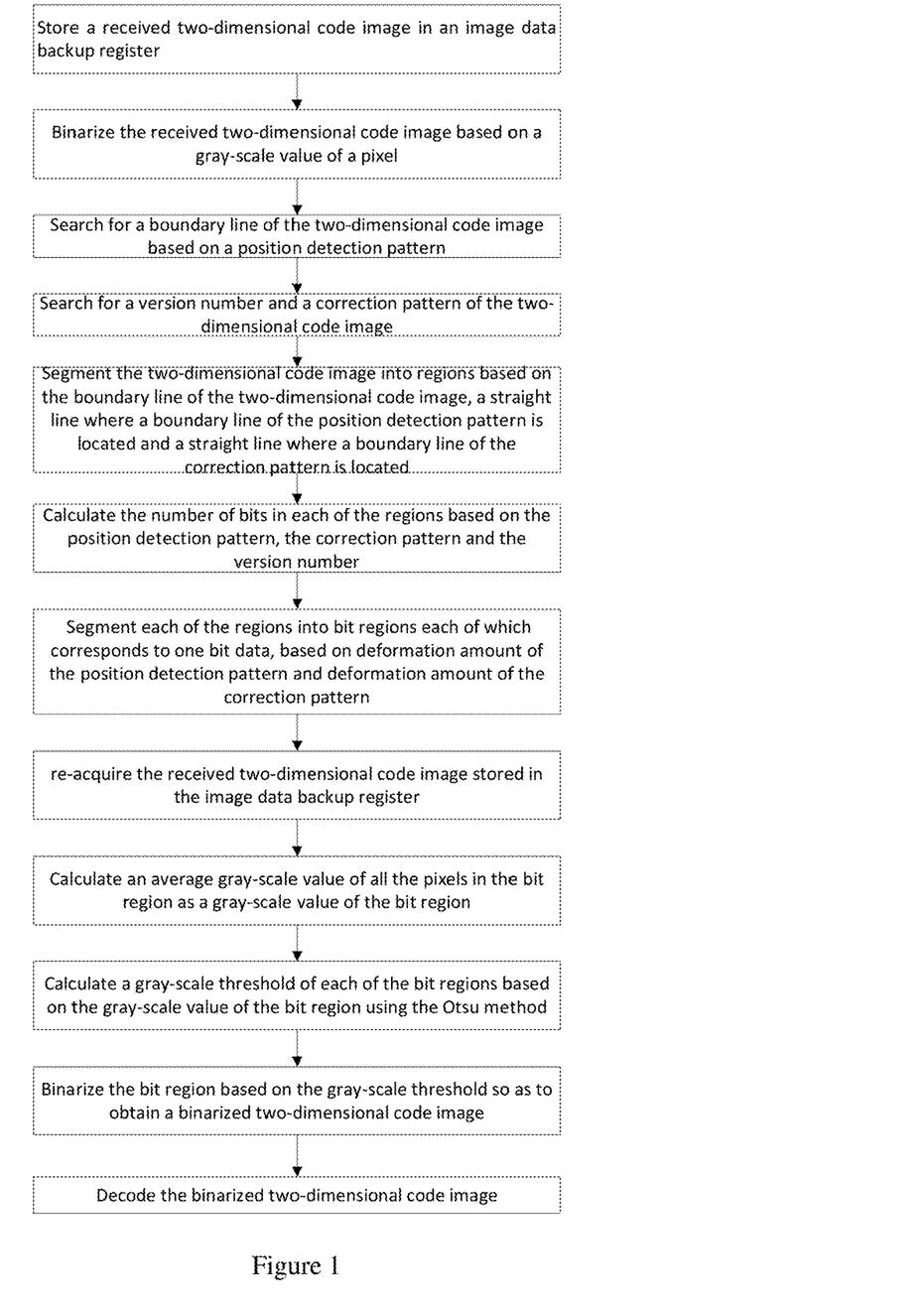
FIG. 1 is a flowchart of a block decoding method for a two-dimensional code according to a first embodiment of the invention.

Referring to FIG. 1, a block decoding method for a two-dimensional code includes:

storing a received two-dimensional code image in an image data backup register;

binarizing the received two-dimensional code image based on a gray-scale value of a pixel;

searching for a boundary line of the two-dimensional code image based on a position detection pattern;

searching for a version number and a correction pattern of the two-dimensional code image;

segmenting the two-dimensional code image into regions based on the boundary line of the two-dimensional code image, a straight line where a boundary line of the position detection pattern is located and a straight line where a boundary line of the correction pattern is located;

calculating the number of bits in each of the regions based on the position detection pattern, the correction pattern and the version number;

segmenting each of the regions into bit regions each of which corresponds to one bit data, based on deformation amount of the position detection pattern and deformation amount of the correction pattern;

re-acquiring the received two-dimensional code image stored in the image data backup register;

calculating an average gray-scale value of all the pixels in the bit region as a gray-scale value of the bit region;

calculating a gray-scale threshold of each of the bit regions based on the gray-scale value of the bit region using the Otsu method;

binarizing the bit region based on the gray-scale threshold so as to obtain a binarized two-dimensional code image; and decoding the binarized two-dimensional code image.

Figure 4:
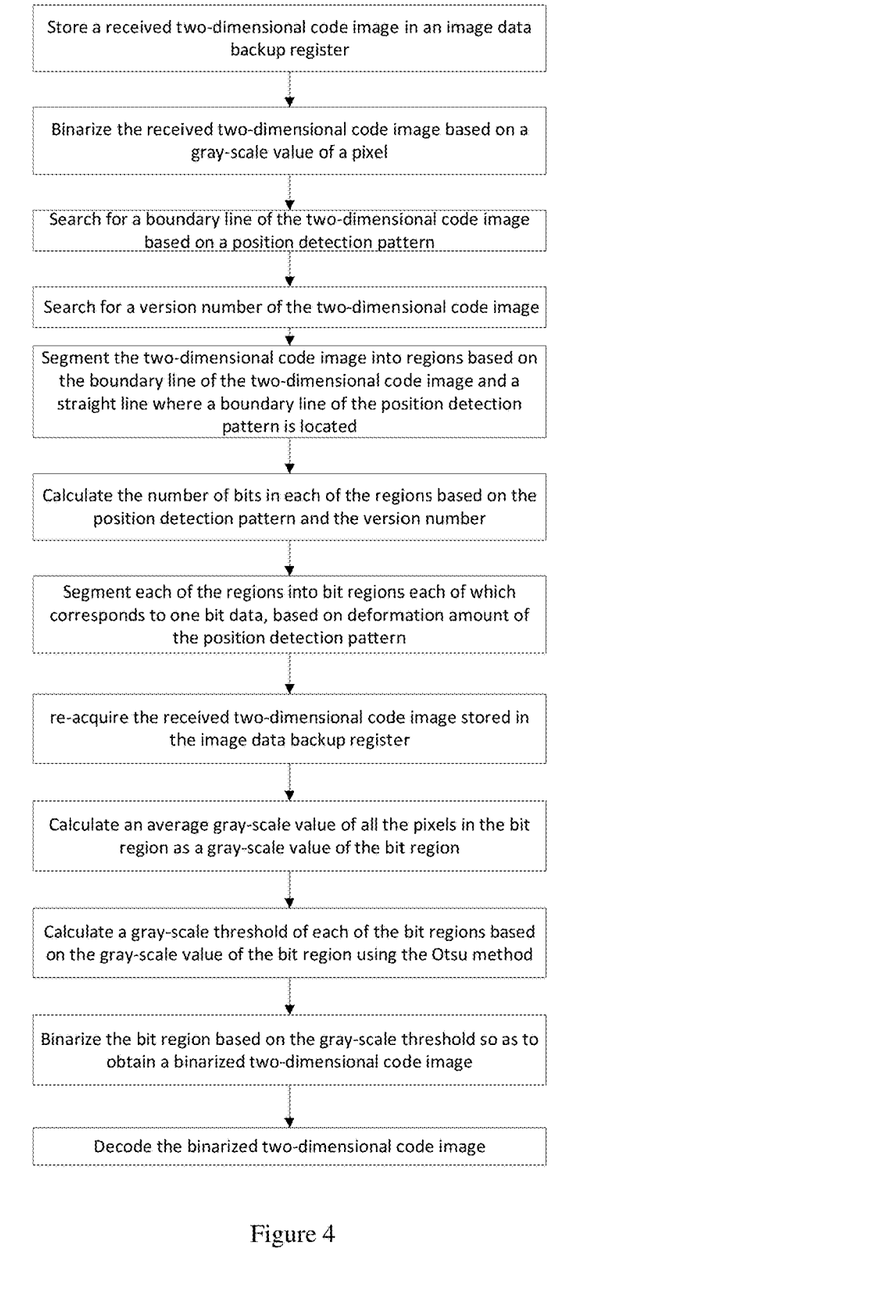
FIG. 4 is a flowchart of a block decoding method of a two-dimensional code according to a second embodiment of the invention.

Referring to FIG. 4, a block decoding method for a two-dimensional code includes:

storing a received two-dimensional code image in an image data backup register;

binarizing the received two-dimensional code image based on a gray-scale value of a pixel;

searching for a boundary line of the two-dimensional code image based on a position detection pattern;

searching for a version number of the two-dimensional code image;

segmenting the two-dimensional code image into regions based on the boundary line of the two-dimensional code image and a straight line where a boundary line of the position detection pattern is located;

calculating the number of bits in each of the regions based on the position detection pattern and the version number;

segmenting each of the regions into bit regions each of which corresponds to one bit data, based on deformation amount of the position detection pattern;

re-acquiring the received two-dimensional code image stored in the image data backup register;

calculating an average gray-scale value of all the pixels in the bit region as a gray-scale value of the bit region;

calculating a gray-scale threshold of each of the bit regions based on the gray-scale value of the bit region using the Otsu method;

binarizing the bit region based on the gray-scale threshold so as to obtain a binarized two-dimensional code image; and decoding the binarized two-dimensional code image.

Further, binarizing the received two-dimensional code image based on the gray-scale value of the pixel specifically includes:

calculating a gray-scale threshold based on the gray-scale value of the pixel using an average value method; and binarizing the received two-dimensional code image based on the gray-scale threshold.

It can be known from the above description that in case where the gray-scale threshold of the received two-dimensional code image is calculated using the average value method, such advantages as small data calculation amount and quick calculation process are realized.

Further, binarizing the received two-dimensional code image based on the gray-scale value of the pixel specifically includes:

calculating a gray-scale threshold based on the gray-scale value of the pixel using the Otsu method; and binarizing the received two-dimensional code image based on the gray-scale threshold.

It can be known from the above description that in case where the gray-scale threshold of the received two-dimensional code image is calculated using the Otsu method, such advantages as reducing the possibility of misclassifying a foreground color from a background color are realized.

Further, searching for the boundary line of the two-dimensional code image based on the position detection pattern specifically includes:

determining two adjacent boundary lines in the two-dimensional code image based on three position detection patterns;

translating the two adjacent boundary lines respectively so that the translated boundary lines pass through corner points of the position detection pattern;

searching for black-and-white demarcation points of the received two-dimensional code image in the proximity of the translated boundary lines; and fitting the black-and-white demarcation points of the received two-dimensional code image using the least squares method so as to obtain the boundary lines of the two-dimensional code image.

It can be known from the above description that when determining the boundary lines of the two-dimensional code image based on three position detection patterns, two adjacent boundary lines in the two-dimensional code image are determined based on two position detection patterns having the same straight-line boundary, then the two adjacent boundary lines are translated, and then black-and-white demarcation points are searched for in the proximity of the translated boundary lines and the black-and-white demarcation points are fitted using the least squares method so as to obtain the boundary lines of the two-dimensional code image, thus having an advantage of quick and accurate positioning.

Further, searching for the version number and the correction pattern of the two-dimensional code image specifically includes:

searching for a position where the version number is located in the two-dimensional code image based on the boundary lines of the two-dimensional code image and the position detection pattern;

decoding an image corresponding to the position where the version number is located to obtain the version number;

determining a position of the correction pattern based on the version number and a shape of the position detection pattern; and searching in the two-dimensional code image for an image corresponding to the position of the correction pattern, and decoding the image to obtain the correction pattern.

It can be known from the above description that the version number in the two-dimensional code image may be found out based on the shape and the position of the position detection pattern, and can be decoded. The position of the correction pattern can be determined based on the version number and the position detection pattern. The above process is reasonable.

Further, segmenting each of the regions into bit regions each of which corresponds to one bit data based on the deformation amount of the position detection pattern and the deformation amount of the correction pattern specifically includes:

calculating a ratio of the lengths of two adjacent bits based on the number of bits and the length of bits of the position detection patterns having the same straight-line boundary or of the correction pattern;

calculating the length of each bit in each region on the same straight-line boundary based on the ratio of the lengths of the two adjacent bits and the number of bits in each region on the same straight-line boundary;

sequentially calculating the length of each bit on the boundaries of all the regions and marking segmenting points; and connecting the segmenting points on two opposite boundaries in each of the regions to segment each region into bit regions each of which corresponds to one bit.

It can be known from the above description that the number of bits in the width direction and the number of bits in the length direction of each region can be calculated based on the number of bits in the length direction and the number of bits in the width direction of the position detection pattern and the correction pattern, and the number of bits in each region is further calculated. The length of bits on the boundary of each region may be calculated based on deformation amount on the boundaries of the position detection pattern and the correction pattern, and each of the regions may be segmented into bit regions each of which corresponds to one bit. The above process is reasonable, thereby preventing decoding precision of the received two-dimensional code image from being affected by the deformation amount of the received two-dimensional code image, and improving decoding precision of the two-dimensional code image.

Further, segmenting each of the regions into bit regions each of which corresponds to one bit data based on the deformation amount of the position detection pattern specifically includes:

calculating a ratio of the lengths of two adjacent bits based on the number of bits and the length of bits of the position detection patterns having the same straight-line boundary;

calculating the length of each bit in each region on the same straight-line boundary based on the ratio of the lengths of the two adjacent bits and the number of bits in each region on the same straight-line boundary;

sequentially calculating the length of each bit on the boundaries of all the regions and marking segmenting points; and connecting the segmenting points on two opposite boundaries in each of the regions to segment each region into bit regions each of which corresponds to one bit.

It can be known from the above description that the number of bits in the width direction and the number of bits in the length direction of each region can be calculated based on the number of bits in the length direction and the number of bits in the width direction of the position detection pattern, and the number of bits in each region is further calculated. The length of bits on the boundary of each region may be calculated based on deformation amount on the boundary of the position detection pattern, and each of the regions may be segmented into bit regions each of which corresponds to one bit. The above process is reasonable, thereby preventing decoding precision of the received two-dimensional code image from being affected by the deformation amount of the received two-dimensional code image, and improving decoding precision of the two-dimensional code image.

Figure 2:
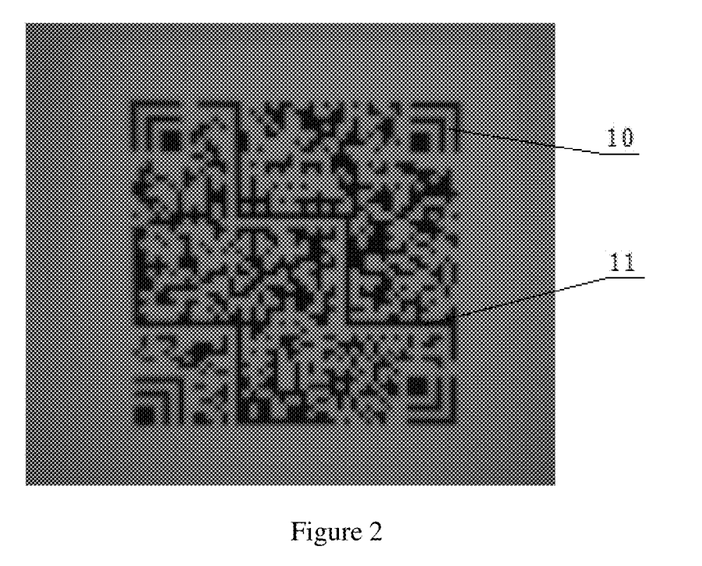
FIG. 2 is an original diagram of a Chinese-sensible code according to the first embodiment of the invention.
Figure 3:
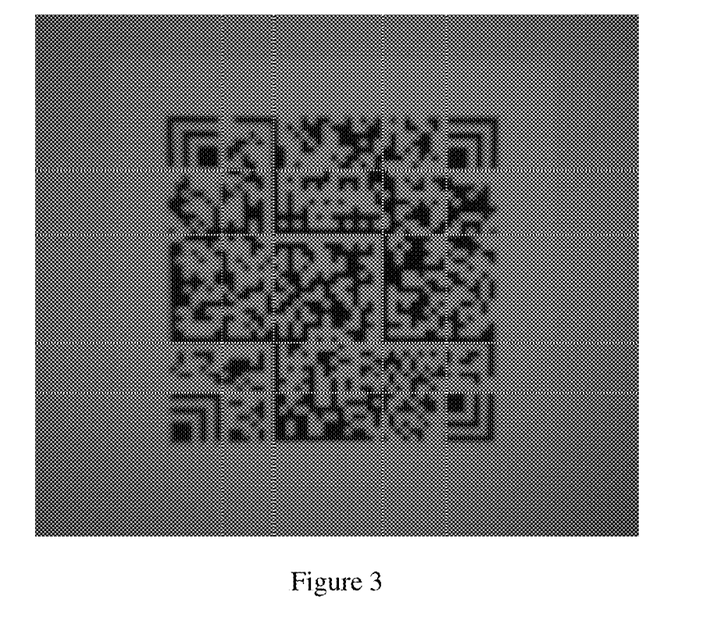
FIG. 3 is a schematic diagram of segmenting the Chinese-sensible code according to the first embodiment of the invention.

Referring to FIG. 1 to FIG. 3, a first embodiment of the invention is described as follows.

A block decoding method for a two-dimensional code is disclosed.

Referring to FIG. 2, a received two-dimensional code image is stored in an image data backup register. The received two-dimensional code is a Chinese-sensible code. A position detection pattern 10 and a correction pattern 11 of the Chinese-sensible code are shown in FIG. 2.

The received two-dimensional code image is binarized based on a gray-scale value of a pixel.

Specifically, gray-scale threshold is calculated based on the gray-scale value of the pixel using an average value method;

the received two-dimensional code image is binarized based on the gray-scale threshold;

a boundary line of the two-dimensional code image is searched for based on the position detection pattern 10.

The version number and the correction pattern 11 of the two-dimensional code image is searched for.

Specifically, a position where the version number is located in the two-dimensional code image can be found out based on the boundary line and the position detection pattern 10 of the two-dimensional code image;

an image corresponding to the position where the version number is located is decoded to obtain the version number;

a position of the correction pattern 11 is determined based on the version number and a shape of the position detection pattern 10;

an image corresponding to the position of the correction pattern 11 is searched for in the two-dimensional code image, and the image is decoded.

Referring to FIG. 3, the two-dimensional code image is segmented into regions based on the boundary line of the two-dimensional code image, a straight line where a boundary line of the position detection pattern 10 is located and a straight line where a boundary line of the correction pattern 11 is located.

The number of bits in each of the regions is calculated based on the position detection pattern 10, the correction pattern 11 and the version number.

Each of the regions is segmented into bit regions each of which corresponds to one bit data based on deformation amount of the position detection pattern 10 and deformation amount of the correction pattern 11.

Specifically, a ratio of the lengths of two adjacent bits can be calculated based on the number of bits and the length of bits of the position detection patterns 10 having the same straight-line boundary or of the correction pattern 11;

the length of each bit in each region on the same straight-line boundary is calculated based on the ratio of the lengths of the two adjacent bits and the number of bits in each region on the same straight-line boundary;

the length of each bit on the boundaries of all the regions is sequentially calculated and segmenting points are marked;

the segmenting points on two opposite boundaries in each of the regions are connected to segment each region into bit regions each of which corresponds to one bit;

the received two-dimensional code image stored in the image data backup register is re-acquired;

an average gray-scale value of all the pixels in the bit region is calculated as a gray-scale value of the bit region;

a gray-scale threshold of each bit region is calculated based on the gray-scale value of the bit region using the Otsu method;

the bit region is binarized based on the gray-scale threshold so as to obtain a binarized two-dimensional code image;

the binarized two-dimensional code image is decoded.

Referring to FIG. 4 to FIG. 7, a second embodiment of the invention is described as follows.

A block decoding method for a two-dimensional code is disclosed.

Figure 5:
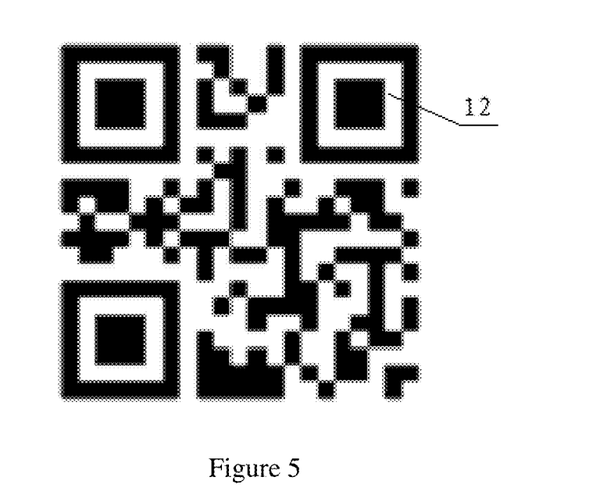
FIG. 5 is an original diagram of a QR code according to the second embodiment of the invention.

Referring to FIG. 5, a received two-dimensional code image is stored in an image data backup register. The received two-dimensional code is a QR code, and a position detection pattern 12 of the QR code is shown in FIG. 5. The QR code in FIG. 5 does not include a correction pattern.

The received two-dimensional code image is binarized based on a gray-scale value of a pixel.

Specifically, a gray-scale threshold is calculated based on the gray-scale value of the pixel using the Otsu method;

the received two-dimensional code image is binarized based on the gray-scale threshold.

Figure 6:
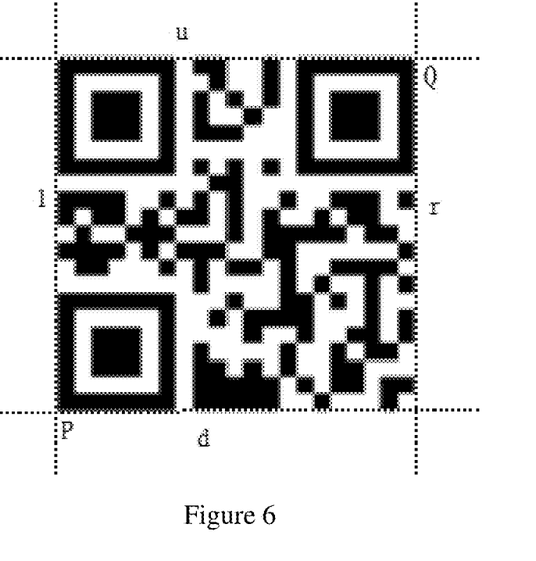
FIG. 6 is a schematic diagram of a boundary line of the QR code according to the second embodiment of the invention.

Referring to FIG. 6, a boundary line of the two-dimensional code image is searched for based on the position detection pattern 12.

Specifically, two adjacent boundary lines u and 1 in the two-dimensional code image can be determined based on three position detection patterns 12;

the two adjacent boundary lines u and 1 are translated respectively so that the translated boundary lines pass through corner points Q and P of the pattern detection pattern 12;

black-and-white demarcation points of the received two-dimensional code image are searched for in the proximity of the translated boundary lines;

the black-and-white demarcation points of the received two-dimensional code image are fit using the least squares method so as to obtain the boundary lines d and r of the two-dimensional code image;

a version number v of the two-dimensional code image is searched for.

Figure 7:
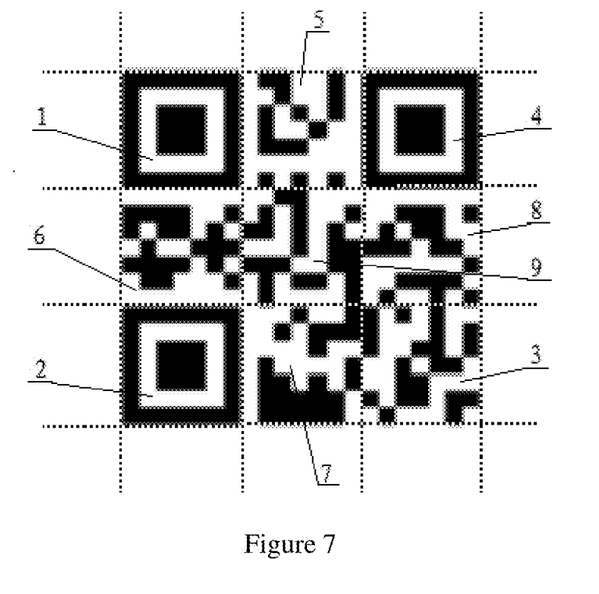
FIG. 7 is a schematic diagram of segmenting the QR code according to the second embodiment of the invention.

Referring to FIG. 7, the two-dimensional code image is segmented into nine regions based on the boundary lines of the two-dimensional code image and straight lines where boundary lines of the position detection patterns 12 are located. The nine regions are a first region 1, a second region 2, a third region 3, a fourth region 4, a fifth region 5, a sixth region 6, a seventh region 7, an eighth region 8 and a ninth region 9.

The number of bits in each region is calculated based on the position detection pattern 12 and the version number v.

Specifically, the position detection pattern 12 in FIG. 6 includes 49 bit regions, wherein seven bits are arranged in a width direction of the position detection pattern 12, and seven bits are arranged in a length direction of the position direction pattern 12. That is, seven bits are arranged at both sides of each of the first region 1, the second region 2 and the fourth region 4, and seven bits are arranged in each of the width direction and the length direction of the third region 3. Seven bits are arranged in the length direction at one side of each of the fifth region 5, the sixth region 6, the seventh region 7 and the eighth region 8.

Seven bits are arranged in the width direction of the fifth region 5. Assuming the total length of the two-dimensional code in a transverse direction is m, m=4v+17 is obtained based on the version number. The length of bits in the length direction of the fifth region 5 is calculated, m−14=4v+3.

The length of the other side of each of the sixth region 6, the seventh region 7 and the eighth region 8 is 4v+3.

Each region is segmented into bit regions each of which corresponds to one bit, based on deformation amount of the position detection pattern 12.

Specifically, a ratio of the lengths of two adjacent bits can be calculated based on the number of bits and the length of bits in each of the position detection patterns 12 having the same straight-line boundary.

Specifically, for example, for an upper length side of the fifth region 5, a straight line where it is located is an upper boundary line of the two-dimensional code image.

Assuming the length of each bit on the upper boundary line of the two-dimensional code image is denoted as $t_i$ from left to right, where i=1, 2, . . . m, and it is known that the length of an upper boundary line of the first region 1 is denoted as $d_1$, the length of an upper boundary line of the fourth region 4 is denoted as $d_4$, the total length of the upper boundary line of the two-dimensional code image is denoted as $d_0$, then the ratio of the lengths of two adjacent bits is represented as $$t_{i+1}/t_4 = \sqrt[(m-7)]{d_4/d_1},$$

The length of each bit in each region on the same straight-line boundary can be calculated based on the ratio of the lengths of the two adjacent bits and the number of bits in each region on the same straight-line boundary.

The length of each bit on the boundaries of all the regions is sequentially calculated, and segmenting points are marked.

The segmenting points on two opposite boundaries in each of the regions are connected to segment each region into bit regions each of which corresponds to one bit.

The received two-dimensional code image stored in the image data backup register is re-acquired.

An average gray-scale value of all the pixels in the bit region is calculated as a gray-scale value of the bit region.

A gray-scale threshold of each of the bit regions is calculated based on the gray-scale value of the bit region using the Otsu method.

The bit region is binarized based on the gray-scale threshold so as to obtain a binarized two-dimensional code image.

The binarized two-dimensional code image is decoded.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number and a correction pattern of the two-dimensional code image;

a first segmenting module which is configured for segmenting the two-dimensional code image into regions based on the boundary line of the two-dimensional code image, a straight line where a boundary line of the position detection pattern is located and a straight line where a boundary line of the correction pattern is located;

a first calculating module which is configured for calculating the number of bits in each of the regions based on the position detection pattern, the correction pattern and the version number;

a second segmenting module which is configured for segmenting each of the regions into bit regions each of which corresponds to one bit data, based on deformation amount of the position detection pattern and deformation amount of the correction pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

A third embodiment of the invention is described as follows.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number and a correction pattern of the two-dimensional code image;

a first segmenting module which is configured for segmenting the two-dimensional code image into regions based on the boundary line of the two-dimensional code image, a straight line where a boundary line of the position detection pattern is located and a straight line where a boundary line of the correction pattern is located;

a first calculating module which is configured for calculating the number of bits in each of the regions based on the position detection pattern, the correction pattern and the version number;

a second segmenting module which is configured for segmenting each of the regions into bit regions each of which corresponds to one bit data, based on deformation amount of the position detection pattern and deformation amount of the correction pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number of the two-dimensional code image;

a first segmenting module which is configured for segmenting the two-dimensional code image into regions based on the boundary line of the two-dimensional code image and a straight line where a boundary line of the position detection pattern is located;

a first calculating module which is configured for calculating the number of bits in each of the regions based on the position detection pattern and the version number;

a second segmenting module which is configured for segmenting each of the regions into bit regions each of which corresponds to one bit data, based on deformation amount of the position detection pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

A fourth embodiment of the invention is described as follows.

A block decoding system for a two-dimensional code includes:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number of the two-dimensional code image;

a first segmenting module which is configured for segmenting the two-dimensional code image into regions based on the boundary line of the two-dimensional code image and a straight line where a boundary line of the position detection pattern is located;

a first calculating module which is configured for calculating the number of bits in each of the regions based on the position detection pattern and the version number;

a second segmenting module which is configured for segmenting each of the regions into bit regions each of which corresponds to one bit data, based on deformation amount of the position detection pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

To sum up, in the block decoding method and system for a two-dimensional code provided by the invention, a boundary of the two-dimensional code image is determined based on a position detection pattern of the received two-dimensional code image, thereby effecting accurate positioning; the two-dimensional code image is segmented into regions based on the straight lines where the position detection pattern and the correction pattern are located, thereby facilitating decoding and reducing an influence of environmental factor such as lights and angle on the received two-dimensional code image; the region is segmented into bit regions each of which corresponds to one bit based on deformation amount of the position detection pattern and deformation amount of the correction pattern, thereby effecting quick decoding of the two-dimensional code image; the received two-dimensional code image stored in the image data backup register is re-acquired after segmenting the two-dimensional code image into regions, and this is equivalent to re-acquiring the coordinates and gray-scale values of the pixels in the received two-dimensional code image, thereby improving decoding precision of the two-dimensional code. In the system, the two-dimensional code image is segmented precisely, thereby avoiding external interference and realizing accurate decoding.

What is claimed is:

1. A block decoding method for a two-dimensional code, characterized by comprising:
    storing a received two-dimensional code image in an image data backup register;
    binarizing the received two-dimensional code image based on a gray-scale value of a pixel;
    searching for a boundary line of the two-dimensional code image based on a position detection pattern;
    searching for a version number and a correction pattern of the two-dimensional code image;
    segmenting the two-dimensional code image into regions based on the boundary line of the two-dimensional code image, a straight line where a boundary line of the position detection pattern is located and a straight line where a boundary line of the correction pattern is located;
    calculating the number of bits in each of the regions based on the position detection pattern, the correction pattern and the version number;
    segmenting each of the regions into bit regions each of which corresponds to one bit data, based on deformation amount of the position detection pattern and deformation amount of the correction pattern;
    re-acquiring the received two-dimensional code image stored in the image data backup register;
    calculating an average gray-scale value of all the pixels in the bit region as a gray-scale value of the bit region;
    calculating a gray-scale threshold of each of the bit regions based on the gray-scale value of the bit region using the Otsu method;
    binarizing the bit region based on the gray-scale threshold so as to obtain a binarized two-dimensional code image; and
    decoding the binarized two-dimensional code image.

2. The block decoding method for a two-dimensional code according to claim 1, wherein binarizing the received two-dimensional code image based on the gray-scale value of the pixel specifically includes:
    calculating a gray-scale threshold based on the gray-scale value of the pixel using an average value method; and
    binarizing the received two-dimensional code image based on the gray-scale threshold.

3. The block decoding method for a two-dimensional code according to claim 1, wherein binarizing the received two-dimensional code image based on the gray-scale value of the pixel specifically includes:
    calculating a gray-scale threshold based on the gray-scale value of the pixel using the Otsu method; and
    binarizing the received two-dimensional code image based on the gray-scale threshold.

4. The block decoding method for a two-dimensional code according to claim 1, wherein searching for the boundary line of the two-dimensional code image based on the position detection pattern specifically includes:
    determining two adjacent boundary lines in the two-dimensional code image based on three position detection patterns;
    translating the two adjacent boundary lines respectively so that the translated boundary lines pass through corner points of the position detection pattern;
    searching for black-and-white demarcation points of the received two-dimensional code image in the proximity of the translated boundary lines; and
    fitting the black-and-white demarcation points of the received two-dimensional code image using the least squares method so as to obtain the boundary lines of the two-dimensional code image.

5. The block decoding method for a two-dimensional code according to claim 1, wherein searching for the version number and the correction pattern of the two-dimensional code image specifically includes:
    searching for a position where the version number is located in the two-dimensional code image based on the boundary lines of the two-dimensional code image and the position detection pattern;
    decoding an image corresponding to the position where the version number is located to obtain the version number;

determining a position of the correction pattern based on the version number and a shape of the position detection pattern; and searching in the two-dimensional code image for an image corresponding to the position of the correction pattern, and decoding the image to obtain the correction pattern.

6. The block decoding method for a two-dimensional code according to claim 1, wherein segmenting each of the regions into bit regions each of which corresponds to one bit data based on the deformation amount of the position detection pattern and the deformation amount of the correction pattern specifically includes:

calculating a ratio of the lengths of two adjacent bits based on the number of bits and the length of bits of the position detection patterns having the same straight-line boundary or of the correction pattern;

calculating the length of each bit in each region on the same straight-line boundary based on the ratio of the lengths of the two adjacent bits and the number of bits in each region on the same straight-line boundary;

sequentially calculating the length of each bit on the boundaries of all the regions and marking segmenting points; and connecting the segmenting points on two opposite boundaries in each of the regions to segment each region into bit regions each of which corresponds to one bit.

7. A block decoding method for a two-dimensional code, characterized by comprising:

storing a received two-dimensional code image in an image data backup register;

binarizing the received two-dimensional code image based on a gray-scale value of a pixel;

searching for a boundary line of the two-dimensional code image based on a position detection pattern;

searching for a version number of the two-dimensional code image;

segmenting the two-dimensional code image into regions based on the boundary line of the two-dimensional code image and a straight line where a boundary line of the position detection pattern is located;

calculating the number of bits in each of the regions based on the position detection pattern and the version number;

segmenting each of the regions into bit regions each of which corresponds to one bit data, based on deformation amount of the position detection pattern;

re-acquiring the received two-dimensional code image stored in the image data backup register;

calculating an average gray-scale value of all the pixels in the bit region as a gray-scale value of the bit region;

calculating a gray-scale threshold of each of the bit regions based on the gray-scale value of the bit region using the Otsu method;

binarizing the bit region based on the gray-scale threshold so as to obtain a binarized two-dimensional code image; and decoding the binarized two-dimensional code image.

8. The block decoding method for a two-dimensional code according to claim 7, wherein binarizing the received two-dimensional code image based on the gray-scale value of the pixel specifically includes:

calculating a gray-scale threshold based on the gray-scale value of the pixel using an average value method; and binarizing the received two-dimensional code image based on the gray-scale threshold.

9. The block decoding method for a two-dimensional code according to claim 7, wherein binarizing the received two-dimensional code image based on the gray-scale value of the pixel specifically includes:

calculating a gray-scale threshold based on the gray-scale value of the pixel using the Otsu method; and binarizing the received two-dimensional code image based on the gray-scale threshold.

10. The block decoding method for a two-dimensional code according to claim 7, wherein searching for the boundary line of the two-dimensional code image based on the position detection pattern specifically includes:

determining two adjacent boundary lines in the two-dimensional code image based on three position detection patterns;

translating the two adjacent boundary lines respectively so that the translated boundary lines pass through corner points of the position detection pattern;

searching for black-and-white demarcation points of the received two-dimensional code image in the proximity of the translated boundary lines; and fitting the black-and-white demarcation points of the received two-dimensional code image using the least squares method so as to obtain the boundary lines of the two-dimensional code image.

11. The block decoding method for a two-dimensional code according to claim 7, wherein segmenting each of the regions into bit regions each of which corresponds to one bit data based on the deformation amount of the position detection pattern specifically includes:

calculating a ratio of the lengths of two adjacent bits based on the number of bits and the length of bits of the position detection patterns having the same straight-line boundary;

calculating the length of each bit in each region on the same straight-line boundary based on the ratio of the lengths of the two adjacent bits and the number of bits in each region on the same straight-line boundary;

sequentially calculating the length of each bit on the boundaries of all the regions and marking segmenting points; and connecting the segmenting points on two opposite boundaries in each of the regions to segment each region into bit regions each of which corresponds to one bit.

12. A block decoding system for a two-dimensional code, characterized by comprising:

a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number and a correction pattern of the two-dimensional code image;

a first segmenting module which is configured for segmenting the two-dimensional code image into regions based on the boundary line of the two-dimensional code image, a straight line where a boundary line of the position detection pattern is located and a straight line where a boundary line of the correction pattern is located;

a first calculating module which is configured for calculating the number of bits in each of the regions based on the position detection pattern, the correction pattern and the version number;

a second segmenting module which is configured for segmenting each of the regions into bit regions each of which corresponds to one bit data, based on deformation amount of the position detection pattern and deformation amount of the correction pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

13. A block decoding system for a two-dimensional code, characterized by comprising a storage module which is configured for storing a received two-dimensional code image in an image data backup register;

a first binarizing module which is configured for binarizing the received two-dimensional code image based on a gray-scale value of a pixel;

a first searching module which is configured for searching for a boundary line of the two-dimensional code image based on a position detection pattern;

a second searching module which is configured for searching for a version number of the two-dimensional code image;

a first segmenting module which is configured for segmenting the two-dimensional code image into regions based on the boundary line of the two-dimensional code image and a straight line where a boundary line of the position detection pattern is located;

a first calculating module which is configured for calculating the number of bits in each of the regions based on the position detection pattern and the version number;

a second segmenting module which is configured for segmenting each of the regions into bit regions each of which corresponds to one bit data, based on deformation amount of the position detection pattern;

an acquiring module which is configured for re-acquiring the received two-dimensional code image stored in the image data backup register;

a second calculating module which is configured for calculating an average gray-scale value of all the pixels in the bit region as a gray-scale value of the bit region;

a third calculating module which is configured for calculating a gray-scale threshold of each of the bit regions based on the gray-scale value of the bit region using the Otsu method;

a second binarizing module which is configured for binarizing the bit region based on the gray-scale threshold so as to obtain a binarized two-dimensional code image; and a decoding module which is configured for decoding the binarized two-dimensional code image.

* * * * *